July 23, 1940.  N. A. PALMGREN  2,209,103
BEARING FOR TAKING AXIAL AND RADIAL LOADS
Filed Oct. 15, 1937  2 Sheets-Sheet 1
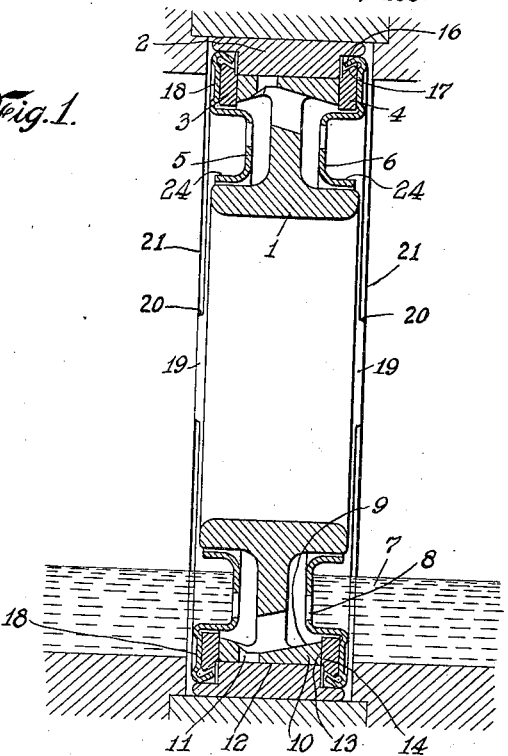
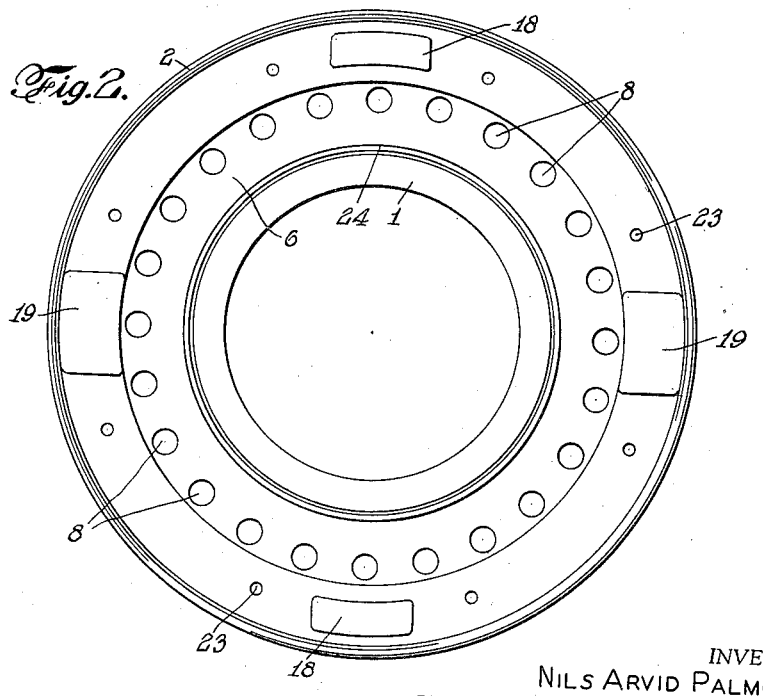
INVENTOR.
NILS ARVID PALMGREN
BY Chas. Lyne Russell
his ATTORNEY.

July 23, 1940.  N. A. PALMGREN  2,209,103
BEARING FOR TAKING AXIAL AND RADIAL LOADS
Filed Oct. 15, 1937  2 Sheets-Sheet 2
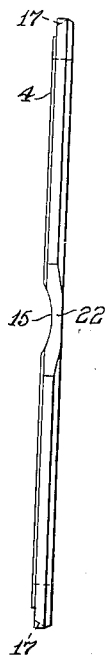
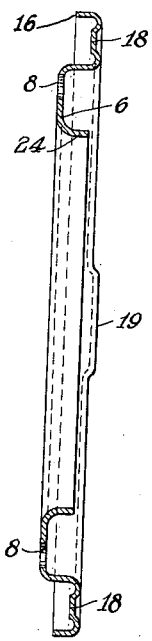
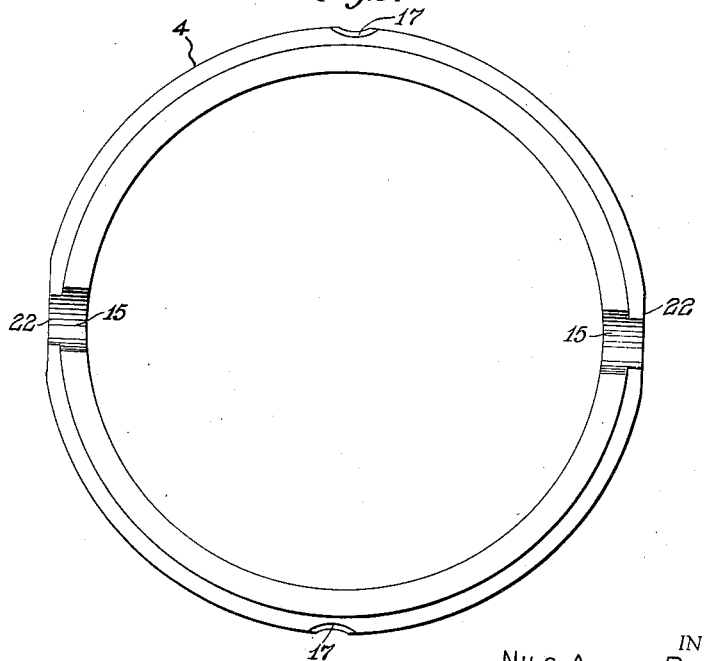
INVENTOR.
NILS ARVID PALMGREN
BY
ATTORNEY.

Patented July 23, 1940

2,209,103

UNITED STATES PATENT OFFICE 2,209,103

BEARING FOR TAKING AXIAL AND RADIAL LOADS

Nils Arvid Palmgren, Goteborg, Sweden, assignor to Aktiebolaget Svenska Kullagerfabriken, Goteborg, Sweden, a corporation of Sweden Application October 15, 1937, Serial No. 169,079
In Great Britain March 8, 1937

3 Claims. (Cl. 308—127)

This invention is for improvements in or relating to bearings capable of sustaining both radial loads and axial thrusts and has for one of its objects to provide a bearing of approximately the same shape and overall dimensions as an ordinary anti-friction bearing, such as a ball or roller bearing. Another object of the invention is to provide means whereby end thrust may be uniformly distributed over the faces of the thrust-taking parts of the bearing and which will accommodate for any slight out-of-alignment between the axis of the stationary part, in the device shown in the drawings the stationary part of the bearing, that is, the axis of the outer ring of the bearing and of the rotating part which the bearing supports.

According to this invention, a bearing capable of sustaining both radial loads and axial thrusts comprises an inner rotatable bearing member arranged for engagement with the shaft or like part to be supported, a fixed outer bearing member arranged to encircle and rotatably support the first said member, a non-rotatable pressure ring arranged slidingly to engage a side face of said rotatable bearing member, which pressure ring is supported against end thrust by a non-rotatable annular shroud member adapted to rest against a fixed thrust-resisting part, which pressure ring, shroud member and thrust-resisting part are so formed that the engagement between each pair of adjacent faces of those parts takes place at two locations at opposite ends of a diameter and so that the two diameters are at right-angles to one another. The pressure ring may be rendered flexible by providing its bearing face with two grooves, one at each end of a diameter which extends transversely to the direction of rotation and by arranging the bearing ring to be supported by the annular thrust member at locations disposed laterally of said grooves. By these means the pressure ring is permitted to flex and to provide wedge-shaped oil spaces between it and the thrust face of the inner bearing member. Preferably, said shroud member is formed on each side thereof with two projections which provide the aforesaid engaging locations. This arrangement enables a certain degree of universal movement of the pressure ring to take place, whereby accommodation is provided for any slight out-of-alignment which may be present between the axis of the bearing and the shaft or like member supported thereby.

The shroud member may be prevented from rotating by providing the fixed thrust-resisting bearing part, the housing or cover member in the present illustration, with means for engaging the projection on the outside of the shroud member.

In order to provide for adequate lubrication between the bearing surfaces, the aforesaid shroud member is arranged to provide an oil-pocket between it and the side of the inner bearing member, which oil-pocket is arranged to communicate with one end of the opposed faces of the pressure ring and the inner bearing member and through an oil-passage in said inner member with the opposed faces of that member and the outer bearing member. The lower part of the bearing is preferably immersed in an oil-bath and the periphery of the pressure ring is provided with one or more escape grooves, whereby the oil can circulate from one side of the pressure ring to the other. One or more holes are formed in the shroud member so as to form a communication between the oil-bath and said oil-pocket. The shroud member thus performs a dual function; it ensures that efficient lubrication of the bearing takes place and also provides a universal support for the pressure ring.

The following is a description of one form of the invention, reference being made to the accompanying drawings, in which:

Figure 1 shows a section along an axial plane of the bearing,

Figure 2 is a side view of the bearing,

Figure 3 is a section through one of the shroud members of Figure 1,

Figure 4 is an edge view of a thrust taking ring, and

Figure 5 is a side view of one of these rings.

As illustrated in Figure 1, the bearing comprises an inner bearing member 1, rotatable within a fixed outer bearing member 2, there being thrust- or pressure-taking rings 3 and 4 located at the sides of the inner bearing member and shroud members 5 and 6 at either side of the bearing. By way of explanation, the shroud member acts as a cover member for separating the rotatable bearing member from the oil bath. A shroud may be defined as something which enfolds, encovers, conceals; a covering, cloak, veil or mask. The bearing illustrated in the drawings is intended for oil-lubrication and for this purpose the bearing is immersed in an oil-bath 7 contained in a housing not illustrated in the drawings. The oil enters the bearing through holes 8 in the shroud member from which it falls upon the internal tapering surface 9 of an outer flange 10 in the inner bearing member 1. The centrifugal force exerted on the lubricant leads the lubricant to the radial channels 11 through which it passes to the cylindrical sliding surface 12 between the members 1 and 2. After having lubricated the bearing surface 12 the oil escapes at the edges of the cylindrical bearing surface 12 and lubricates the thrust-taking surfaces 13 and 14 of the flange 10 and the thrust-taking ring members 3 and 4 respectively. In order to facilitate the entry of lubricant between these thrust-taking surfaces, the thrust-taking members 3 and 4 are at two diametrically opposed points provided with radially-extending grooves 15 as will be seen from Figures 4 and 5.

The arrangement of the thrust-taking ring out of the shroud member is as follows. The shroud members are annular in shape, the cross-section being of S-form. The thrust-taking rings 3 and 4 fit into one of the loops or troughs of each of the shroud plates and are retained in place by bending over a portion 16 of the edge of the shroud members to engage notches 17 at two diametrically opposed points of the thrust-taking rings. The shroud members are at two opposite ends of their diameters, provided with projections or bulges 18 directed toward the central plane of the bearing and abutting against the outward side of the thrust-taking rings 3 and 4. The outer surfaces of the thrust-taking rings 3 and 4 will, therefore, engage only the projections 18, but will not otherwise engage the plain surfaces of the shroud members. At two diametrically opposed places, 90° removed from the projections 18, the shroud members are provided with projections 19 extending in an opposite direction to the projections 18. When the bearing is built into a housing, the projections 19 will engage shoulders 20 of the housing or the cover members 21. It will therefore be seen, that the shroud members 5 and 6 form universal supports for the thrust-taking rings 3 and 4, the nature of the device being such that it permits the thrust-taking rings 3 and 4 to pivot with respect to the shroud members about an axis passing through the projections 18 and permitting the thrust-taking rings together with the shroud members to pivot about an axis passing through the projections 19 with respect to the housing. It is, therefore, apparent that the thrust-taking rings are free to assume the positions, in which their thrust-taking surfaces 14 are parallel to the thrust-taking surfaces 13 of the inner bearing member 1, thus preventing the concentration of the thrust loads on only a portion of the thrust-taking surface. In order to permit movement about the axis through the projections 18, it should be pointed out that the notches 17 and the projections 18 should be located at the same part of the circumference. further, the groove 15 should be located half-way between the projections 18, so that the thrust-taking rings 3 and 4 can yield at this point to permit of the formation of oil wedges beginning at the grooves 15 and extending along the sliding surface of the thrust-taking rings 3 and 4.

The thrust-taking rings 3 and 4 are cut off at point 22 to enable lubricant to pass around the edges of the thrust-taking rings and continue back of the thrust-taking rings, between these rings and the shroud members 5 and 6 to holes 23 in the shroud members, through which the lubricant escapes back to the oil-bath.

Although the invention has in the above been described in connection with an oil-lubricated bearing, it is equally applicable to a grease-lubricated bearing, in which case there will be no holes 8 and 23 in the shroud member, the lubricant being contained within the space enclosed by the shroud members. In order to enable more lubricant to be introduced into the bearing, the inner portions of the shroud members can be placed further outwards, the axially-extending flanges 24 being turned inwardly instead of outwardly as shown in Figure 1.

I claim:

1. A bearing capable of sustaining both radial loads and axial thrust and comprising an inner rotatable bearing member arranged for engagement with the shaft or like part to be supported, a fixed outer bearing member arranged to encircle and rotatably support the first said member, an oil bath within which the inner member rotates a non-rotatable pressure ring arranged slidingly to engage a side face of said rotatable bearing member, a fixed thrust resisting part, a non-rotatable annular shroud member adapted to rest against the fixed thrust-resisting part, and to support the pressure ring against end thrusts, the shroud member serving for separating the rotatable bearing member from the oil bath, which pressure ring, shroud member and thrust-resisting part are so formed that the engagement between each pair of adjacent faces of those parts takes place at two locations at opposite ends of a diameter and so that the two diameters are at right-angles to one another, the non-rotatable pressure ring being rendered flexible by providing its bearing face with two grooves one at each end of a diameter extending transversely to the direction of rotation, the bearing ring being arranged to be supported by the annular thrust member at locations disposed laterally of said grooves, the shroud member being formed on each side with two projections providing the aforesaid engaging locations.

2. A bearing capable of sustaining both radial loads and axial thrust and comprising an inner rotatable bearing member arranged for engagement with the shaft or like part to be supported, a fixed outer bearing member arranged to encircle and rotatably support the first said member, an oil bath within which the inner member rotates a non-rotatable pressure ring arranged slidingly to engage a side face of said rotatable bearing member, a fixed thrust resisting part, a non-rotatable annular shroud member adapted to rest against the fixed thrust-resisting part, and to support the pressure ring against end thrusts, the shroud member serving for separating the rotatable bearing member from the oil bath, which pressure ring, shroud member and thrust-resisting part are so formed that the engagement between each pair of adjacent faces of those parts takes place at two locations at opposite ends of a diameter and so that the two diameters are at right-angles to one another, the shroud member being formed on each side with two projections providing the aforesaid engaging locations, with the said fixed thrust-resisting part, the latter being provided with means engaging the projections on the outside of the shroud member for the purpose described.

3. A bearing capable of sustaining both radial loads and axial thrust and comprising an inner rotatable bearing member arranged for engagement with the shaft or like part to be supported, a fixed outer bearing member arranged to encircle and rotatably support the first said member, an oil bath within which the inner member rotates a non-rotatable pressure ring arranged slidingly to engage a side face of said rotatable bearing member, a fixed thrust resisting part, a non-rotatable annular shroud member adapted to rest against the fixed thrust-resisting part, and to support the pressure ring against end thrusts, the shroud member serving for separating the rotatable bearing member from the oil bath, which pressure ring, shroud member and thrust-resisting part are so formed that the engagement between each pair of adjacent faces of those parts takes place at two locations at opposite ends of a diameter and so that the two diameters are at right-angles to one another, the non-rotatable pressure ring being rendered flexible by providing its bearing face with two grooves one at each end of a diameter extending transversely to the direction of rotation, the bearing ring being arranged to be supported by the annular thrust member at locations disposed laterally of said grooves, the shroud member being formed on each side with two projections providing the aforesaid engaging locations, and the said fixed thrust-resisting part, it being provided with means for engaging the projections on the outside of the shroud member for the purpose described.

NILS ARVID PALMGREN.